United States Patent [19]

Kubo et al.

[11] Patent Number: 4,796,904
[45] Date of Patent: Jan. 10, 1989

[54] REAR WHEEL STEERING DEVICE FOR FRONT AND REAR WHEEL STEERING SYSTEM

[75] Inventors: Kanji Kubo; Kenichi Ohno, both of Wako, Japan

[73] Assignee: Honda Giken Kogyo Kabuchiki Kaisha, Tokyo, Japan

[21] Appl. No.: 25,583

[22] Filed: Mar. 13, 1987

[51] Int. Cl.⁴ .............................................. B62D 7/00
[52] U.S. Cl. ...................................... 280/91; 180/141
[58] Field of Search .................. 280/91; 180/140, 141, 180/142, 143

[56] References Cited

U.S. PATENT DOCUMENTS 4,105,086 8/1978 Ishii et al. .............................. 280/91
4,295,657 10/1981 Sano et al. ............................ 280/91

FOREIGN PATENT DOCUMENTS 2130986 6/1984 United Kingdom .................. 280/91

*Primary Examiner*—Kenneth R. Rice
*Attorney, Agent, or Firm*—Nixon & Vanderhye

[57] ABSTRACT

In a rear wheel steering device for a front and rear wheel steering system of a wheeled vehicle wherein rear wheels are steered by displacement of tie rods connected to the knuckles of the rear wheels and disposed in the lateral direction of the vehicle in an opposite phase relationship relative to the front wheels at least under a certain condition such as a small steering angle or a low vehicle speed, the centers of the turning radii of the rear wheels are made to coincide with each other by determining the geometry of the tie rods and the knuckle arms in such a manner that a pair of imaginary lines formed by connecting the pivot points between the knuckle arms and the tie rods to the points of intersection between a horizontal plane containing the said pivot points and the center lines of rotation of the knuckles relative to the vehicle body intersect at a point which is located ahead of the center line of the rear wheel axle. As a result, the slip angle of the rear wheels is minimized, particularly when the steering angle is great.

3 Claims, 3 Drawing Sheets

REAR WHEEL STEERING DEVICE FOR FRONT AND REAR WHEEL STEERING SYSTEM

BACKGROUND OF THE INVENTION

This invention relates to a rear wheel steering device for a front and rear wheel steering system of a vehicle and in particular to a rear wheel steering device of this type which is capable of improving the maneuverability of the vehicle when the rear wheels are steered in the opposite phase relative to the front wheels.

PRIOR ART

Various rear and front wheel systems have been proposed. For instance, copending U.S. patent applications Nos. 822,000, 822,293, 821,998, 822,008, 822,010 and 822,043 claiming Conventional priority based on the original Japanese filing data of Jan. 24, 1985 disclose steering devices for vehicles which allow the rear wheels to be steered in correspondence with the steering of the front wheels in accordance with vehicle speed. According to these devices, the rear wheels are generally steered in the same phase relationship, or none at all, in a high speed range and are steered in the opposite phase relationship in a low speed range. The steering angle ratio is, for instance, a continuous function of the vehicle speed, with the steering angle ratio assuming a positive value or a same-phase relationship when the vehicle speed is greater than a certain value and assuming a negative value or an opposite-phase relationship when the vehicle speed is lower than that value, whereby the behavior of the vehicle in all speed ranges can be improved. For instance, in the low speed range, because the rear wheels are steered in the opposite phase relationship, the minimum angle of turning said the inner radius difference between the inner and outer wheels (the degree of difference between the paths of the inner and the outer wheels) are both drastically reduced and the maneuverability of the vehicle when driving it into a garage or through narrow and tortuous alleyways, or when making a U-turn, is substantially improved. In the high speed range, the dynamic lateral responses of the vehicle when, for instance, changing driving lanes, are much improved.

According to U.S. Pat. No. 4,295,657 assigned to the same assignee, the rear wheels are steered in the opposite phase relationship when the steering angle is small and in the same phase relationship when the steering angle is great. This structure simplifies the steering mechanism for the rear wheels and yet achieves substantially the same effect as the previously mentioned front and rear wheel steering systems.

When a vehicle equipped with one of such front and rear wheel steering systems makes a turn with a large steering angle in the low speed range, side slipping of the wheels strongly affects the handling performance of the vehicle, and it is not sufficient to simply steer the rear wheels in the opposite phase relationship for the purpose of improving the capability of the vehicle to turn with a small turning radius. It is generally desirable for the centers of the turning radii of the inner wheel and the rear wheel to coincide with each other and the geometric relationship of the steering links which assures such steering angles for the inner wheel and the outer wheel has been known as Ackermann geometry and has been widely used in conventional steering systems for front wheels.

However, in a front and rear wheel steering device capable of changing the phase relationship of the steering angle of the rear wheels relative to the steering angle of the front wheels at different vehicle speeds or when the magnitude of the steering angle input varies, it is difficult to make the centers of the turning radii of all four wheels coincide with each other at all times. In particular, the rear wheel steering devices of conventional four wheel steering vehicles have not been provided with Ackermann geometry.

BRIEF SUMMARY OF THE INVENTION

In view of such problems of the prior art, a primary object of this invention is to provide a rear wheel steering device for a front and rear wheel steering system in which the side slip angles of the rear wheels are minimized and the handling performance of the vehicle is improved when the rear wheels are steered in the opposite phase relationship relative to the front wheels.

Another object of the present invention is to provide a rear wheel steering device for a front and rear wheel steering system which is simple to implement.

According to this invention, such objects are accomplished by providing a rear wheel steering device for a front and rear wheel steering system of a wheeled vehicle wherein rear wheels are steered by displacement of tie rods connected to knuckles of the rear wheels and disposed in the lateral direction of the vehicle in an opposite phase relationship relative to the front wheels at least under a certain condition, characterized in that: a pair of imaginary lines formed by connecting pivot points between the knuckle arms and the tie rods to corresponding points of intersection between a horizontal plane containing the said pivot points and center lines of rotation of the knuckles, as they are steered, relative to a body of the vehicle intersect at a point which is located ahead of the center line of the rear wheel axle.

Thus, it becomes possible to make the steering angle of the inner rear wheel larger than the steering angle of the outer rear wheel and by properly selecting the geometry of the links it is possible to make the centers of the turning radii of the rear wheels approximately coincide with each other.

According to a certain aspect of the present invention, the rear wheels are steered in the opposite phase relationship when the steering angle is greater than a certain value or when the speed of the vehicle is less than a certain value and are otherwise steered in the same phase relationship or not steered at all. According to the geometry described above, the centers of the turning radii of the inner and the outer wheel may not exactly coincide with each other at all times, but that is the case only when, the steering angle of the rear wheels is quite small or the vehicle speed is quite high and the slip angles of the rear wheels are therefore not of major significance.

In implementing the above described geometry, the pivot points between the knuckle arms and the tie rods may be located either behind or ahead of the points of intersection between the horizontal plane containing the said pivot points and the center lines of rotation of the knuckles as they are steered relative to the vehicle body.

BRIEF DESCRIPTION OF THE DRAWINGS

Now embodiments of this invention will be described in the following with reference to the appended drawings, in which.

DETAILED DESCRIPTION OF THE PREFERRED EMBODIMENT

Figure 1:
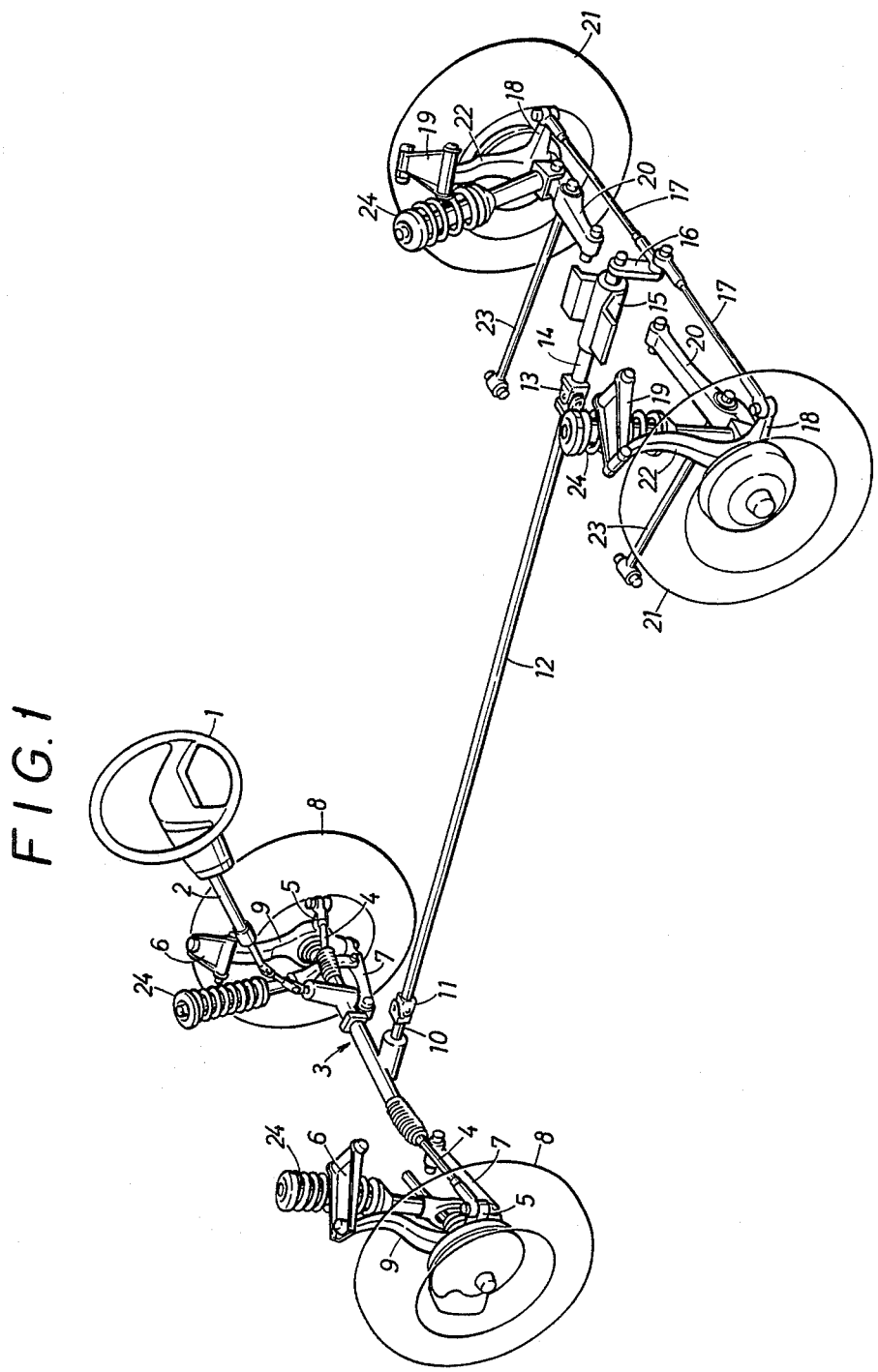
FIG. 1 is a perspective view showing the suspension system and the steering system of a vehicle to which the rear wheel steering device of the present invention is applied.

FIG. 1 generally shows the suspension system and the steering system of a front and rear wheel steering vehicle to, which an embodiment of the rear wheel steering device of the present invention is applied. A steering shaft 2 which is connected to the steering wheel 1 of this vehicle is joined to a gear box 3 of a rack and pinion type at it lower end, and the two ends of a rack gear not shown in the drawings are connected to the inner ends of tie rods 4 by way of ball joints. The other ends or the external ends of the tie rods 4 are connected to knuckle arms 5 for the respective front wheels 8. The knuckle arms 5 integrally project from knuckles 9 which support the front wheels 8 and are in turn supported at their upper and lower ends by upper arms 6 and lower arms 7, respectively, each of which are pivotally connected to the vehicle body at their other ends.

A pinion shaft 10 extends rearward from the gear box 3, and the rear end of the pinion shaft 10 is connected, by way of a universal joint 11, to a connecting shaft 12 which extends all the way to the steering device for the rear wheels. The pinion shaft 10 is provided with a pinion (not shown in the drawings) which meshes with the rack gear incorporated in the gear box 3 and is turned at a certain gear ratio a the steering wheel 1 is turned.

The steering device for the rear wheels 21 comprises an input shaft 14 which is connected to the rear end of the connecting shaft 12 by way of a universal joint 13 and is secured to the vehicle body by way of bearing bracket 15 fixedly attached to a rear part of the vehicle body. The rear end of the input shaft 14 which projects rearward is connected to a crank member 16 having a radially extending arm. The radially external end of the arm 16a of the crank member 16 is connected to the internal ends of a pair of tie rods 17 by way of ball joints. The external ends of the tie rods 17 are connected to knuckle arms 8 of the knuckles 22 for the rear wheels 21. The knuckles 22 are supported by upper arms 19 and lower, arms 20 at their upper and lower ends, respectively. These arms 19 and 20 are pivotally connected to the vehicle body at their internal ends in a manner similar to the corresponding parts for the front wheels. The lower arms 20 are also connected to radius rods 23 at their intermediate portions for added rigidity of the lower arms 20 against the reactions which the rear wheels 21 experience in relation to the road surface.

The knuckles 9 and 22 are supported by suspension systems 24 each of which comprises a coil spring and an oil damper.

Thus, as the steering wheel 1 is turned the front wheels 8 are steered by virtue of the steering force transmitted thereto by way of the internal mechanism of the gear box 3 and the tie rods 4 of the front wheels 8. At the same time, the steering torque of the steering wheel 1 is also transmitted to the pinion shaft 10 and is further transmitted to the connecting shaft 12 and the input shaft 14. As the input shaft 14 is rotated, the crank member 16 is rotated and the rear wheels 21 are steered by way of the tie rods 17.

According to the present embodiment, the crank member 16 is fixedly attached to the input shaft 14 in such a manner that the arm 16a depends vertically downwards when the front wheels 8 are in their neutral positions. At this time, the rear wheels 21 are also in their neutral positions. Therefore, when the steering angle is small and the motion of the arm 16a of the crank member 16 is limited to the range below the horizontal plane which contains the axial line of the input shaft 14, the rear wheels 21 are steered in the same phase relationship as the front wheels 8. However, when the steering angle is great and the crank arm 16a is rotated above the horizontal plane, the rear wheels 21 are steered in the opposite phase relationship relative to the front wheels 8.

According to this structure, the rotational angle of the crank member 16 relative to the steering angle of the steering wheel 1 can be freely selected, for instance, by changing the gear ratio of the gear box 3, by changing the length of the crank arm 16a, or by installing a speed reduction means in a suitable place in the path of transmission of the steering torque from the steering wheel 1 to the rear wheels 21, and a desired steering angle ratio between the front wheels and the rear wheel can thus be achieved both readily and freely.

Figure 2:
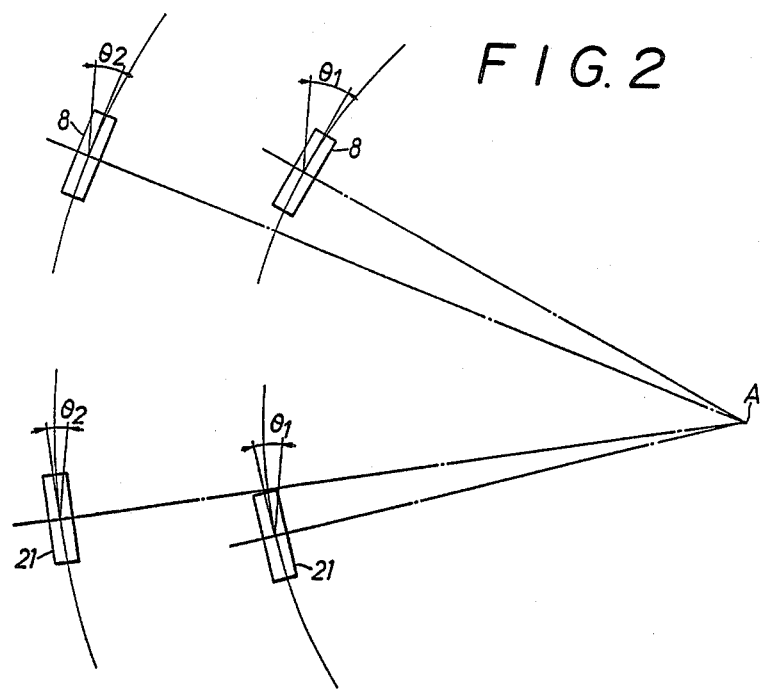
FIG. 2 shows the trajectories of the four wheels of the vehicle as it makes a turn.

The side slip of the rear wheels 21 when the rear wheels 21 are steered in opposite phase relationship relative to the front wheels can be eliminated if the centers of the turning radii of all the wheels coincide with each other at point A (FIG. 2). To that end, it is necessary to determine the relationship between the steering angle A1 of the inner wheel and the steering angle A2 of the outer wheel so that A1>A2 for both of the front wheel pair and the rear wheel pair.

Figure 3:
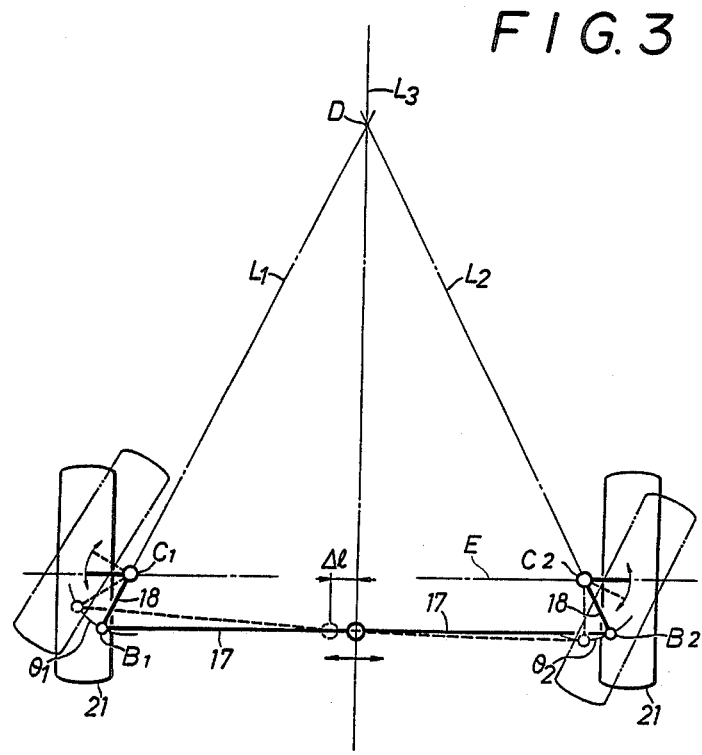
FIG. 3 shows the relationships between the links which are included in an embodiment of the rear wheel steering device of the present invention.

FIG. 3 shows the relationship of the links involved in the rear wheel steering device of the present embodiment. The lines L1 and L2 formed by connecting the pivot points B1 and B2 between the tie rods 17 and the knuckle arms 18 to the corresponding points C1 and C2 of intersection between a horizontal plane containing the said pivot points B1 and B2 and the center lines of rotation of the knuckles 22 or the rear wheels 21, as they are steered, relative to a body of the vehicle are made to intersect each other at a point D located on the center line L3 of the vehicle extending parallel to the longitudinal axial line of the vehicle ahead of the axial line E of the rear wheel axle.

Therefore, the rotational angle of the knuckle arm 18 of the inner wheel relative to the displacement delta 1 of the tie rods 17 as the rear wheels are steered to assume the position indicated by the broken lines can be made larger than that of the outer wheel, with the result that the turning trajectories shown in FIG. 2 can be accomplished. This tendency is enhanced the further the point D moves towards the front of the vehicle, and is reduced as the point D retreats towards the line E. There is, however, a limit to the extent to which the point D can move towards the line E as the tie rods 17 will lose their ability to steer the rear wheels 21 at a practical angle if the point D moves too close to the line E.

As can be readily understood from simple geometric considerations, as an alternative, the points B1 and B2 may be located on the line L1 and L2 between the point D and the points C1 and C2, respectively.

Thus, according to the present invention, the side slip angles of the rear wheels are effectively reduced in a very simple manner. According to the present embodiment, the slip angles of the rear wheels at a large steering angle are not considered and. However, the problem with the difference between the centers of the turning radii between the inner wheel and the outer wheel arises when the steering angle is large and under such a condition considerable difficulties may arise with the maneuverability of the vehicle because the tires of the rear wheels are forced to slip sideways against the frictional resistance to which they are subjected by the road surface. On the other hand, when the steering angle is small, the side slip of the rear wheels is not critical because with the steering angle so small, the slip angle which is no more than a fraction of the latter is even smaller. Such a small slip angle can be readily accommodated by the slipping of the tires of the rear wheels without any problem.

Figure 4:
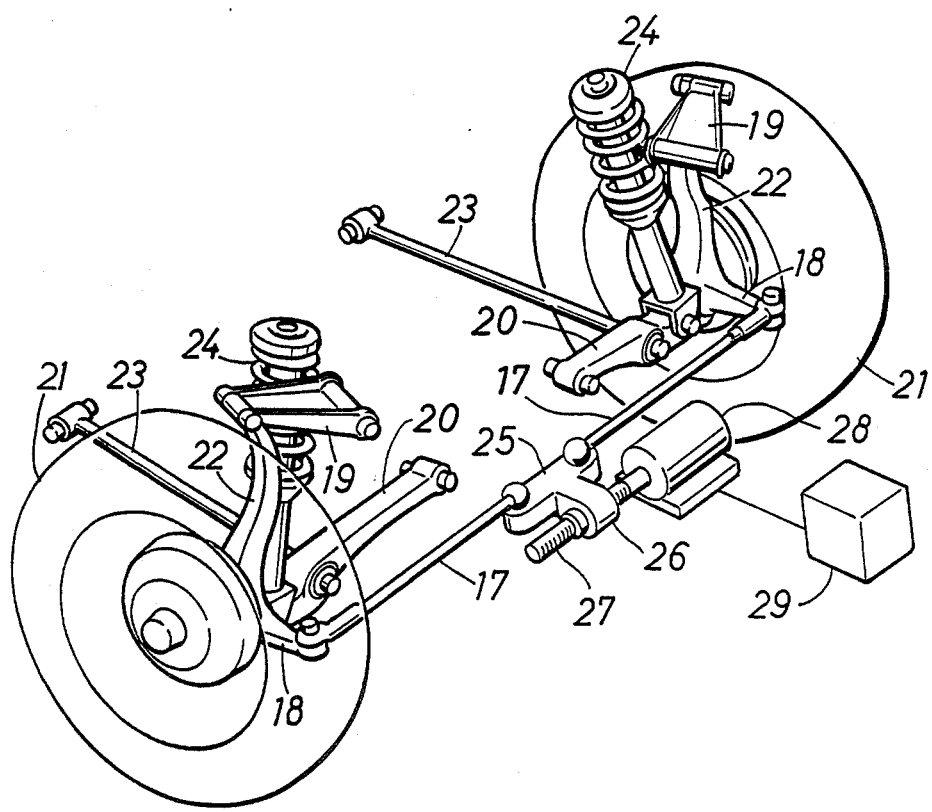
FIG. 4 is a perspective view of another embodiment of the rear wheel steering device according to the present invention.

FIG. 4 shows another embodiment of the present invention. This embodiment is similar to the previous one except that the internal ends of the tie rods are pivotally connected to a block 25 which is integrally provided with a threaded portion 26. A screw rod 27 is threadingly engaged with the threaded portion 26 and can be turned by an electric motor 28 in accordance with a control signal supplied from a control unit 29. The control unit 29 is provided with a central processing unit and is connected to various sensors so that the rear wheels 21 may be steered by the electric, motor 28 in the opposite phase relationship relative to the front wheels when the vehicle speed is low and are otherwise steered in the same phase relationship or not steered at all when the vehicle speed is high. In this embodiment also, the geometry described in conjunction with FIG. 3 is present and the inner wheel is steered at a greater steering angle than the outer wheel when the vehicle speed is low and the rear wheels are steered in the opposite phase relationship relative to the front wheels.

Although the present invention has been shown and described with reference to the preferred embodiment thereof, it should not be considered as limited thereby. Various possible modifications and alterations could be conceived of by one skilled in the art with respect to any particular embodiment without departing from the scope of the invention.

What we claim is:

1. A rear wheel steering device for a front and rear wheel steering system of a wheeled vehicle wherein rear wheels are steered by displacement of tie rods connected to knuckles of the rear wheels and disposed in the lateral direction of the vehicle in an opposite phase relationship relative to the front wheels at least under a certain condition, characterized in that:

a pair of imaginery lines formed by connecting pivot points between the knuckle arms and the tie rods to corresponding points of intersection between a horizontal plane containing the said pivot points and center lines of rotation of the knuckles, as they are steered, relative to a body of the vehicle intersect at a point which is located ahead of a center line of the rear wheel axle, wherein said pivot points between the knuckle arms and the tie rods are located behind the points of intersection between the horizontal plane containing said pivot points and the center lines of rotation of the knuckles relative to the vehicle body.

2. A rear wheel steering device as defined in claim 1, wherein the rear wheels are steered in the opposite phase relationship when the steering angle is greater than a certain value and are otherwise steered in the same phase relationship or not steered at all.

3. A rear wheel steering device as defined in claim 1, wherein the rear wheels are steered in the opposite phase relationship when the speed of the vehicle is less than a certain value and are otherwise steered in the same phase relationship or not steered at all.

* * * * *